(12) United States Patent
Lee et al.

(10) Patent No.: US 7,573,841 B2
(45) Date of Patent: Aug. 11, 2009

(54) METHOD FOR TRANSMITTING TRAFFIC INDICATION MESSAGE IN WIRELESS COMMUNICATION SYSTEM, BASE STATION THEREOF, METHOD FOR RECEIVING THE SAME, TERMINAL THEREOF AND MESSAGE STRUCTURE THEREOF

(75) Inventors: Kang-Gyu Lee, Yongin-si (KR); Yun-Sung Kim, Yongin-si (KR); Jin-A Kim, Seoul (KR); Sung-Wook Park, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 316 days.

(21) Appl. No.: 11/156,833

(22) Filed: Jun. 20, 2005

(65) Prior Publication Data

US 2006/0009267 A1 Jan. 12, 2006

(30) Foreign Application Priority Data

Jun. 19, 2004 (KR) ...................... 10-2004-0045894

(51) Int. Cl.
*G08C 17/00* (2006.01)
*H04H 20/71* (2008.01)

(52) U.S. Cl. ...................... 370/311; 370/312

(58) Field of Classification Search ............. 370/311, 370/312, 260, 349; 455/574
See application file for complete search history.

(56) References Cited

U.S. PATENT DOCUMENTS 5,745,860 A 4/1998 Kallin
6,438,375 B1 8/2002 Müller
6,597,660 B1 * 7/2003 Rueda et al. ............. 370/230.1
6,622,251 B1 * 9/2003 Lindskog et al. ............ 713/300
2005/0049013 A1 3/2005 Chang et al.

FOREIGN PATENT DOCUMENTS

EP 1 530 384 5/2005
WO WO 01/69859 9/2001

OTHER PUBLICATIONS

Chulsik Yoon et al., "Enhancement on Sleep Mode Operation by Grouping", Jan. 2, 2004.
Itzik Kitroser et al., "IEEE 802.16e Sleep Mode", Mar. 11, 2005.
Itzik Kitroser, "Handoff/Sleep-Mode Changes", Jul. 14, 2003.

* cited by examiner

*Primary Examiner*—George Eng
*Assistant Examiner*—Michael Faragalla
(74) *Attorney, Agent, or Firm*—The Farrell Law Firm, LLP

(57) ABSTRACT

Disclosed are methods for transmitting/receiving a traffic indication message in a wireless communication system. In the wireless communication system, a base station (BS) groups a plurality of sleep mode IDs, and broadcasts a traffic indication message that includes first bitmap information indicating whether traffic corresponding to respective the sleep mode ID groups exists as well as second bitmap information indicating whether traffic indicators with respect to the respective sleep mode IDs that belong to the sleep mode ID groups exists. A mobile subscriber station (MS) which is allocated with any one of the plurality of sleep mode IDs, determines whether the traffic occurs in the sleep mode ID group to which the MS itself belongs using the first bitmap information if the MS receives the traffic indication message, and checks the traffic indicator of the terminal itself using the second bitmap information if the traffic occurs in the sleep mode ID group to which the MS belongs.

32 Claims, 6 Drawing Sheets

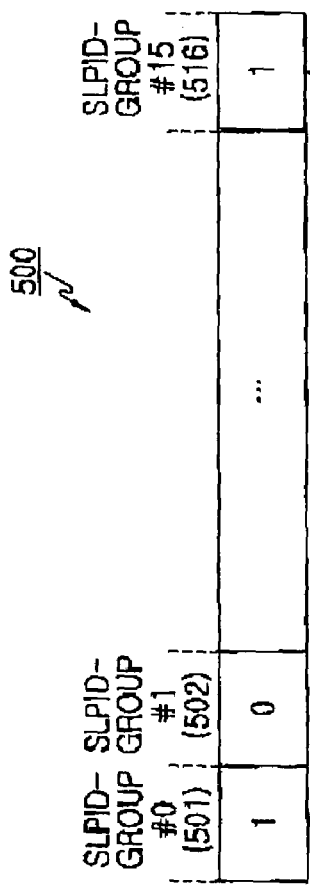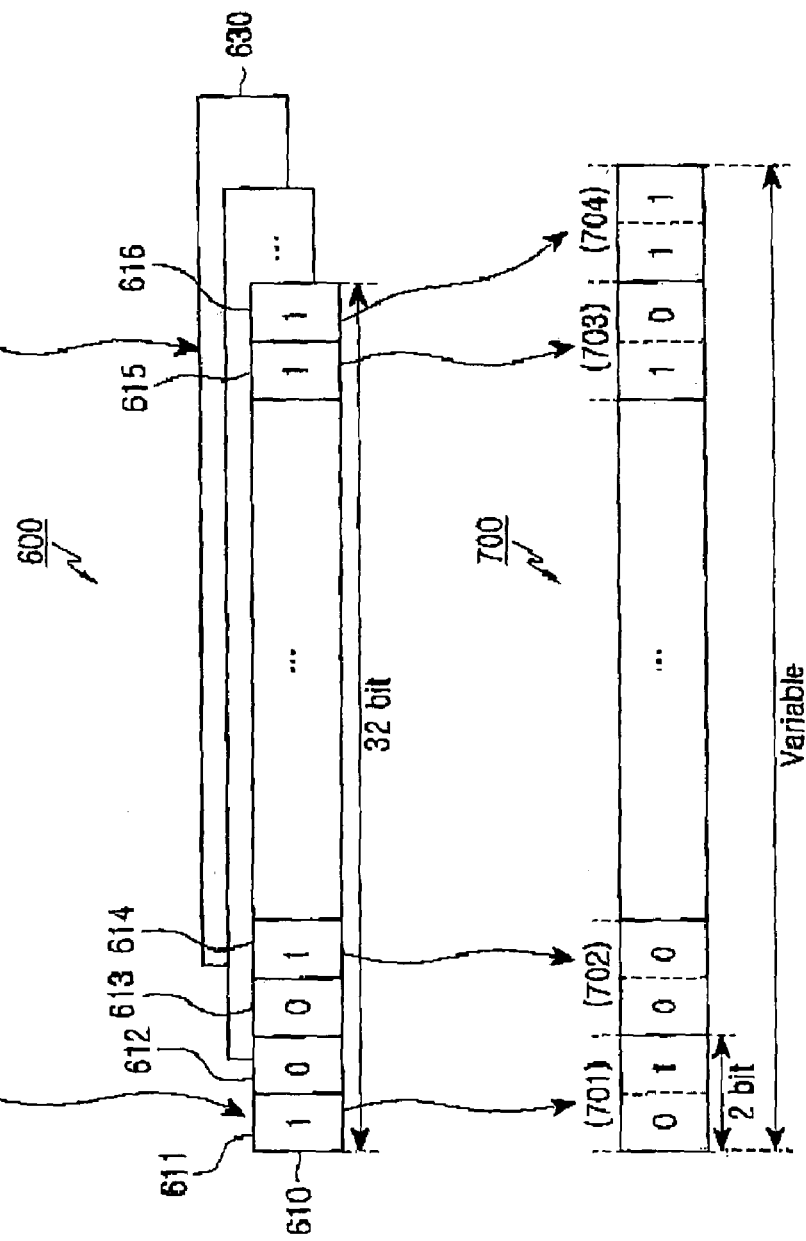

METHOD FOR TRANSMITTING TRAFFIC INDICATION MESSAGE IN WIRELESS COMMUNICATION SYSTEM, BASE STATION THEREOF, METHOD FOR RECEIVING THE SAME, TERMINAL THEREOF AND MESSAGE STRUCTURE THEREOF

PRIORITY

This application claims priority under 35 U.S.C. § 119(a) to a Korean Patent Application filed in the Korean Intellectual Property Office on Jun. 19, 2004 and assigned Ser. No. 2004-45894, the disclosure of which is incorporated herein by reference.

BACKGROUND OF THE INVENTION

1. Field of the Invention

The present invention relates to the technology of transmitting/receiving a traffic indication message in a wireless communication system.

2. Description of the Related Art

FIG. 1 is a block diagram illustrating the construction of a typical wideband wireless communication system. Respective MS (Mobile Stations) 10 and 12 generally have mobility, and are connected to a backbone network 30 through respective BSs (Base Stations) 20 and 22. The MS 10 and 12 provide connections between the BSs 20 and 22 and subscribers (not shown). Additionally, the BSs 20 and 22 provide functions for controlling, and managing MS 10 and 12 and for connectivity of the MS 10 and 12. The backbone network 30 is connected to an ASA (Authentication and Service Authorization Server) 40 for the authentication of the MS 10 and 12 and service authorization.

Reducing power consumption is an important factor for MS supporting mobility. One method for reducing the power consumption of the MS is to employ a sleep mode. In the sleep mode, all functions (e.g., transmission functions, reception functions, etc.,) of the MS other than for an RTC (Real Time Clock) function and a PLL (Phase Locked Loop) function, are stopped. During the sleep mode, the PLL remains in an active state so that the MS can be easily awakened (i.e., returned to a normal state), thus ending the sleep mode. While in the sleep mode, the MS is periodically awakened in order to perform a search, a ranging, or a handover for neighboring BS's, etc. A wideband wireless communication system which functions under standard such as the Institute for Electrical and Electronics Engineers (IEEE) 802.16E, standard (the Standard), reduces the power consumption of the MS and allows the MS to perform a handover more smoothly when in the sleep mode.

Specifically, the MS that enters into the sleep mode undergoes a sleep interval and a listening interval. For a frame corresponding to the sleep interval, the MS stops the transmission/reception of data to reduce its power consumption, and for a frame corresponding to the listening interval, the MS may, depending upon the situation, return to a normal state to perform a periodic ranging. In other words, the MS that enters into the listening interval should be awakened because the MS should decode a TRF-IND (Traffic Indication) message transferred from the BS and determine whether there is any DL (Download) traffic, for the MS and may also take advantage of a periodic ranging opportunity. That is, the MS should return to a receiving state by awakening from the sleep mode and returning to a normal state (i.e., an awake state).

The corresponding BS should transmit the traffic indication to the MS that is in a sleep mode and that is managed by the BS itself at the listening interval using a broadcast CID. Accordingly, the BS, if it receives incoming data of a specified MS that is operating in a sleep mode, may buffer the corresponding traffic data until the corresponding MS reaches its listening interval. The BS may drop the incoming data according to the existing conditions. Hereinafter, the procedure of performing the sleep mode by the MS will be explained with reference to FIG. 2.

FIG. 2 is a flow diagram illustrating a procedure of performing a sleep mode by an MS. The MS 10 transmits a request message MOB-SLP-REQ to the BS 20 so that it can enter into the sleep mode at step 50. The BS 20 that has received the request message transmits a response message MOB-SLP-RSP for informing the corresponding MS 10 of an approval/rejection of the request so that the corresponding MS 10 can enter into the sleep mode at step 52. The MS 10, if it receives the response message from the BS 20, enters into the sleep mode. As described above, the MS 10 undergoes the sleep interval 60 and the listening interval 62 in the sleep mode.

Then, the BS 20 sends the MS 10 a traffic indication message MOD-TRF-IND for informing the MS of the existence of a corresponding MS-related message and traffic data buffered in the BS 20 to match the listening interval 62 of the corresponding MS 10 according to a sleep mode pattern agreed through the request/response messages. If the traffic indication message is received, the MS 10 checks if the MS-related message and the traffic data exist in the traffic indication message, and if so, MS 10 shifts to an awake state in which the MS 10 can receive the message.

Here, the traffic indication message MOB-TRF-IND is a type of broadcasting message that indicates the existence or nonexistence of traffic of a plurality of MS. Specifically, the BS broadcasts the traffic indication message that indicates the existence or nonexistence of traffic to the plurality of MS that share the listening interval. However, according to the present standard, the BS cannot properly provide the traffic indication message to the MS that is in the sleep mode.

In other words, due to a vague definition, in the Standard as described above, the BS cannot transfer a functional traffic indication message to the MS that are in the sleep mode through the MOB-TRF-IND message.

SUMMARY OF THE INVENTION

Accordingly, the present invention has been designed to solve the above and other problems occurring in the prior art, and provides a proper traffic indication using the optimum number of bits by allowing for the BS to properly control the MOB-TRF-IND message (which is a type of broadcasting message) according to the amount of traffic buffered until the corresponding BSS enters into a listening interval.

According to embodiments of the present invention, in a wireless communication system, a base station groups a plurality of sleep mode IDs, and broadcasts a traffic indication message that includes first bitmap information indicating whether traffic corresponding to the sleep mode ID groups exists as well as second bitmap information indicating whether traffic indicators with respect to the respective sleep mode IDs that belong to the sleep mode ID groups exists. Additionally, a mobile station, which is allocated with any one of the plurality of sleep mode IDs, determines whether the traffic exists in the sleep mode ID group to which the terminal itself belongs using the first bitmap information if the mobile station receives the traffic indication message, and checks the traffic indicator of the terminal itself using the second bitmap information if the traffic exists in the sleep mode ID group to which the terminal belongs.

BRIEF DESCRIPTION OF THE DRAWINGS

The above and other objects, features and advantages of the present invention will be more apparent from the following detailed description taken in conjunction with the accompanying drawings, in which:

FIGS. 4A to 4C are views illustrating traffic indication signaling according to a second embodiment of the present invention;

DETAILED DESCRIPTION OF THE PREFERRED EMBODIMENTS

Figure 1:
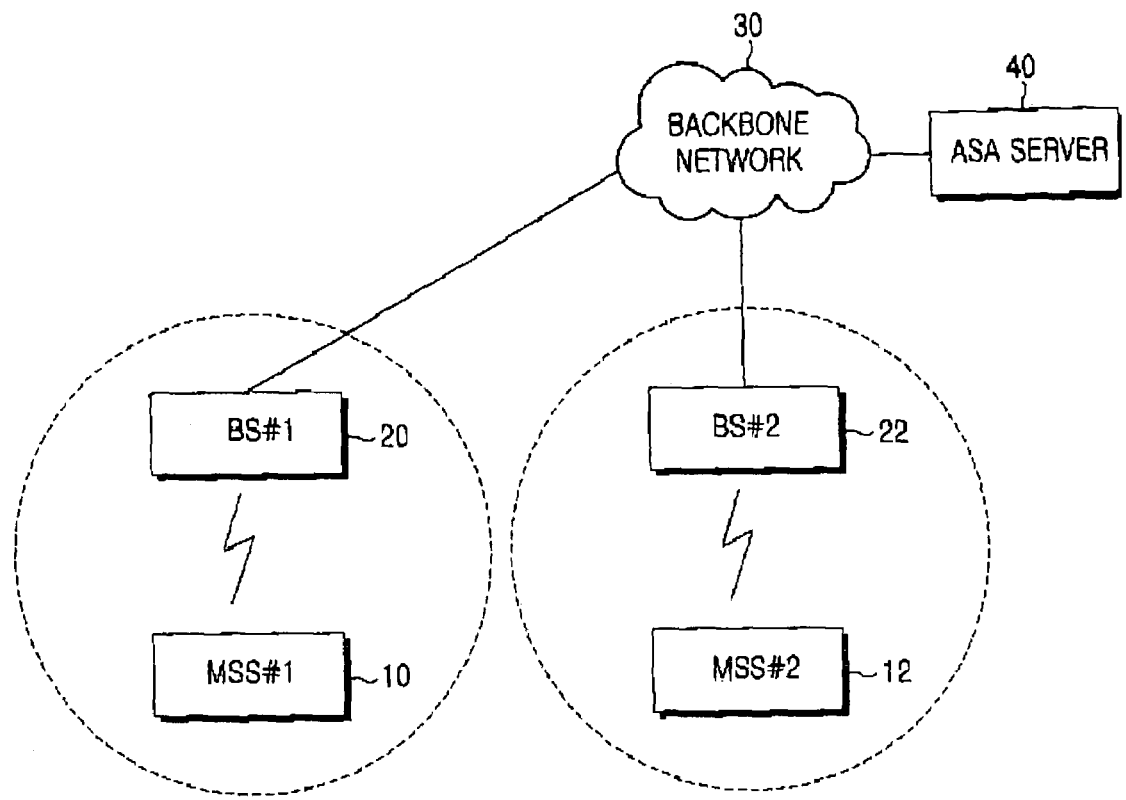
FIG. 1 is a block diagram illustrating the construction of a typical wideband wireless communication system.
Figure 2:
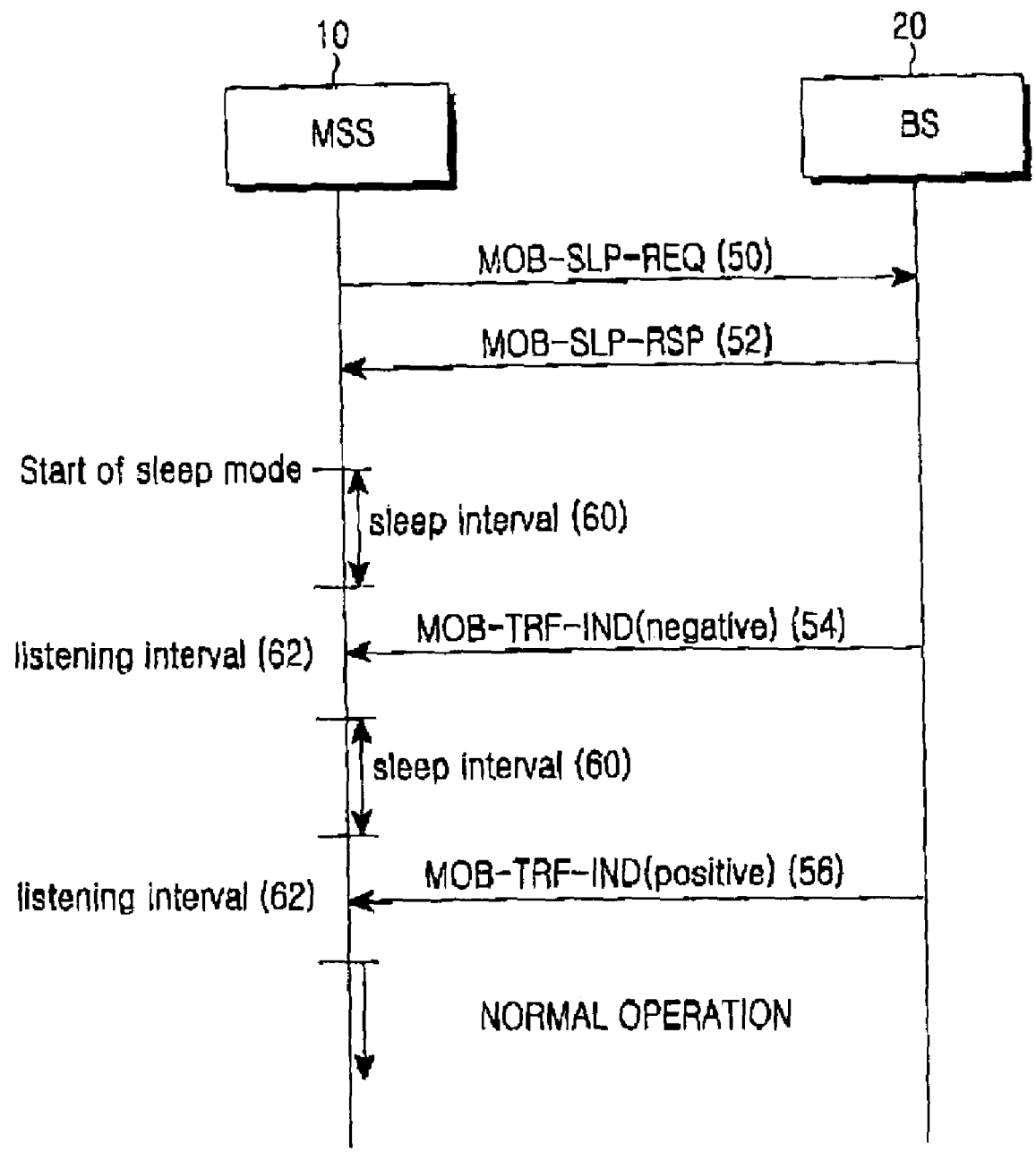
FIG. 2 is a flow diagram illustrating a procedure of performing a sleep mode by an MS.

Preferred embodiments of the present invention will be described in detail hereinafter with reference to the accompanying drawings. In the following description of the present invention, the same drawing reference numerals are used for the same elements even in different drawings. Additionally, a detailed description of known functions and configurations incorporated herein will be omitted when it may obscure the subject matter of the present invention.

In the embodiments of the present invention, a method whereby a BS properly provides quick traffic indication/ SLPID Indicator information to an MS that operates in a sleep mode through a MOB-TRF-IND message and a method whereby an MS receives a MOB-TRF-IND message from a BS and detects the MS's traffic indicator from the received MOB-TRF-IND message have been proposed. The structure of the MOB-TRF-IND message according to the embodiment of the present invention will now be explained.

Figure 3A:
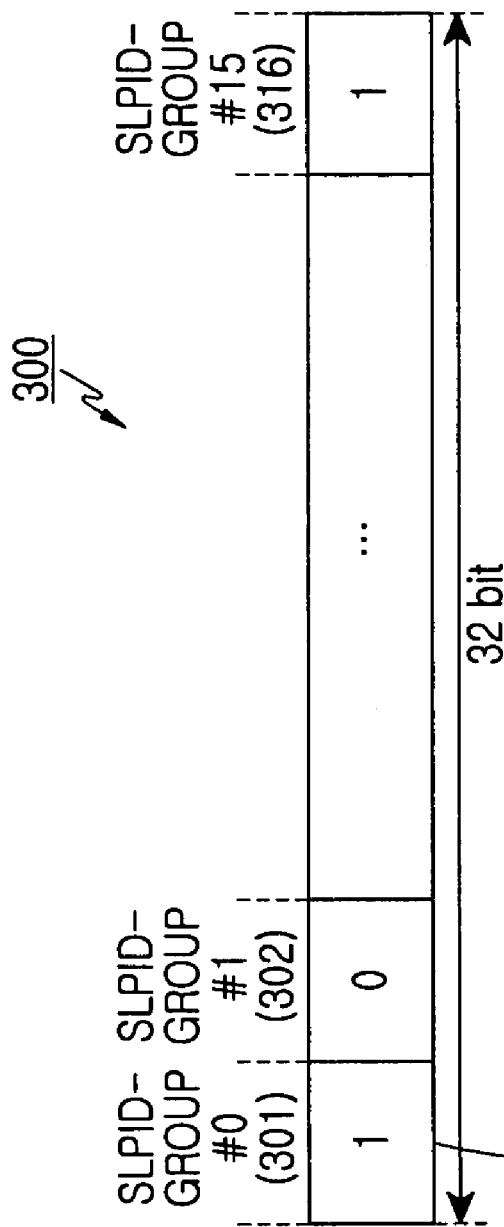
FIGS. 3A and 3B are views illustrating traffic indication signaling according to a first embodiment of the present invention.
Figure 3B:
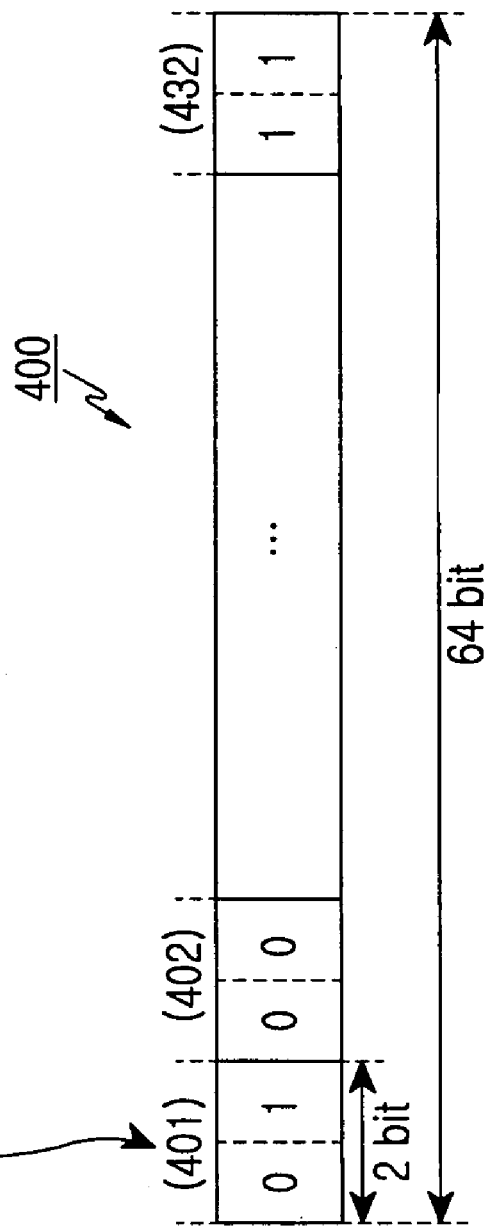

FIGS. 3A and 3B illustrate fields that belong to an SLPID group according to a first embodiment of the present invention, and FIGS. 4A to 4C illustrate fields that belong to an SLPID group according to a second embodiment of the present invention.

In the present invention, an SLPID Group-Indication bitmap field, an SLPID-Indication bitmap field, a Traffic-Indicator bit map field and a Half-traffic mask field may be used instead of the "Byte of SLPID bitmap" field and the "SLPID bitmap" field in which are used by the Standard. The SLPID-Indication bitmap field and the half-traffic mask field according to an embodiment of the present invention may be selectively adopted according to the system to which the present invention is applied to. Alternatively, the SLPID-Indication bitmap field and the half-traffic mask field may be selectively adopted according to the desires of a system operator.

In the following description, it is assumed that in the case in which the BS approves the entering of the sleep mode with respect to the sleep-mode requests received from the respective MS that are managed by the BS itself, the BS can allocate that SLPID=0, . . . , 511. It will be understood by those skilled in the art that the number of SLPIDs may be more than 512. For example, the number of SLPIDs may be 1024, and it will be apparent to those skilled in the art that the present invention may be modified accordingly.

First, the SLPID-Group-Indication Bitmap will be explained. According to the present invention, the BS groups the SLPIDs by tying a predetermined number of SLPIDs in a group. In the embodiment of the present invention, 16 SLPID groups (i.e., SLPID-Group#0 to SLPID-Group#15) are made by arranging 32 SLPIDs in a group. That is, if the SLPID value allocated by the BS is in the range of 0 to 31, the BS manages it as SLPID-Group#0, and if the SLPID value is in the range of 32 to 63, the BS manages it as SLPID-Group#1. In the same manner, the SLPID values in the range of 480 to 511 are tied in SLPID-Group#15. If the traffic exists in the terminal that is allocated with the SLPID that belongs to SLPID-Group#n, the BS sets the corresponding SLPID-Group#n to "1".

Accordingly, in the embodiment of the present invention, the SLPID-Group #n has 16 bits (=b15, b14, . . . b2, b1, b0). Meanwhile, bn (where n=0, 1, . . . , 15) indicates the group of MS corresponding to SLPID=32n to (32n+31). Accordingly, if a periodic ranging opportunity and a DL traffic occur in the MS corresponding to SLPID=33, the BS can inform the SLPID0-Group#1 corresponding to SLPID=32 to 63 of the occurrence of traffic by setting b1=1. Accordingly, the respective bit#n (=bn) of this field represents SLPID-Group#n (n=0, 1, . . . , 15). Accordingly, the SLPID-Group#n is chosen from among {SLPID-Group#0, SLPID-Group#1, . . . , SLPID-Group#15}. In FIGS. 3A and 4A, the SLPID-Group-Indication Bitmap fields 300 and 500 are illustrated. As illustrated, respective bits 301, 302, . . . , 316 of the SLPID-Group-Indication Bitmap field 300 (See FIG. 3a) and respective bits 501, 502, . . . , 516 of the SLPID-Group-Indication Bitmap field 500 (See FIG. 4a) correspond to the SLPID-Group#n, and indicate in which group the traffic occurs.

Second, the SLPID-Indication Bitmap field is composed of 32-bit maps the number of which is as many as the number (N=0, . . . , 16) of SLPID-Group#n in which bn that represents the SLPID-Group#n is set to "1". Accordingly, 16 32-bit maps may exist at maximum, and if no traffic occurs in any SLPID-Group among 16 SPLID-Groups, this field may not exist since N=0. Here, the respective bits that constitute the respective 32-bit map correspond to the respective SLPIDs that constitute the corresponding SLPID-Group. For example, if SLPID-Group-Indication Bitmap=11111 11111 11110 1 (binary), bit#1 corresponding to the SLPID-Group#1 is bit#1=0, and thus the 32-bit map corresponding to the SLPID-Group#1 is excluded from the SLPID-Indication Bitmap. Thus, the number N of SLPID-Group-Indication Bitmaps becomes N=15. Accordingly, if SLPID-Group-Indication Bitmap=11111 11111 11110 1, and the traffic of the MS corresponding to SLPID=65 occurs, the BS should inform the corresponding MS of the occurrence of the traffic through the second corresponding 32-bit map in the SLPID-Indication Bitmap. In FIG. 4B, SLPID-Indication Bitmap field 600 is illustrated.

As illustrated in FIG. 4B, if bn of the SLPID-Group#n is "1", SLPID-Indication Bitmaps 610, . . . , 630 having respective bits are generated so as to indicate whether the traffic occurs corresponding to the respective SLPIDs of the corresponding SLPID group. For example, if the corresponding SLPID group is composed of 32 tied SLPIDs, a 32-bit SLPID-Indication Bitmap is generated. In FIG. 4B, the SLPID-Indication Bitmap 610 for the SLPID-Group#0 bit 501 that is set to "1" in the SLPID-Group-Indication Bitmap, . . . , the SLPID-Indication Bitmap 630 for the SLPID-Group#15 bit 516 are illustrated. As described above, since the bit 502 of the SLPID-Group#1 is "0", the corresponding SLPID-Group-Indication Bitmap is not generated. Additionally, respective bits 611, 612, . . . , 616 of the SLPID-Indication Bitmap indicate whether the traffic occurs with respect to the corresponding SLPID.

Third, the Traffic-Indicator Bitmap will be explained. The Traffic-Indicator Bitmap is a set of traffic indicator information of SLPIDs of which the traffic occurrence is reported through the SLPID-Group-Indication Bitmap and/or the SLPID-Indication Bitmap. This traffic indicator is composed of two bits, and provides the indication of four traffic states. In indicating the four traffic states, "00" indicates the state that no periodic ranging opportunity exists and no PDUs (Packet Data Units) such as download traffic and so on exist. "01" indicates the state that no periodic ranging opportunity exists, but PDUs (Packet Data Units) such as download traffic and so on exist. "10" indicates the state that a periodic ranging opportunity exists, but no PDUs (Packet Data Units) such as download traffic and so on exist. "11" indicates the state that a periodic ranging opportunity exists and PDUs (Packet Data Units) such as download traffic also exist. In this case, the Traffic-Indicator Bitmap may be a multiple of two bits, and has a variable length. Meanwhile, the Traffic-Indicator indicates the traffic state of the respective SLPIDs of the SLPID-Group#n in which the traffic occurs, and is composed of one bit in this case.

Meanwhile, in the first embodiment of the present invention, the SLPID-Group-Indication Bitmap includes traffic indicators of all SLPIDs of the SLPID group that indicate the occurrence of the traffic. FIG. 3B illustrates the Traffic-Indicator Bitmap field according to the first embodiment of the present invention. As illustrated, the Traffic-Indicator Bitmap field 400 may include two-bit traffic indicators for the respective SLPIDs. Since one SLPID group includes 32 SLIPDs, the Traffic-Indicator Bitmap field includes two-bit traffic indicators for 32 SLPIDs, and thus it has a length that corresponds to a multiple of 64 bits.

Additionally, the Traffic-Indicator Bitmap field 400 may include one-bit traffic indicators that indicate whether the traffic occurs with respect to the respective SLPIDs of the SLPID-Group#n. In this case, since one SLPID group includes 32 SLPIDs, the Traffic-Indicator Bitmap field includes traffic indicator unit having a length of 32 bits with respect to all SLPID groups of which the SLPID-Group Indication bit is "1", and thus it has a length of a multiple of 32 bits. That is, the traffic indicator has a length of a multiple of the number of a sleep mode IDs that belong to the SLPID-group.

Here, the traffic indicators of the Traffic-Indicator Bitmap are allocated in the ascending order of their SLPID values of the SLPID-Group in which the traffic occurs.

Additionally, in the first embodiment of the present invention, the corresponding SLPID does not include the SLPID-Indication Bitmap. As described above, since all the SLPIDs of the SLPID-Group in which the traffic occurs include the traffic indicators, the traffic indicator of the respective SLPID indicates the traffic state of the respective SLPID. Accordingly, the SLPID-Indication Bitmap for indicating that the traffic occurs in the respective SLPIDs of the corresponding SLPID group is not required.

In the second embodiment of the present invention, the two-bit traffic indicators for the SLPIDs in which no traffic actually occurs do not exist in the Traffic-Indicator Bitmap. FIG. 4C illustrates the Traffic-Indicator Bitmap field according to the second embodiment of the present invention. As illustrated, the Traffic-Indicator Bitmap field 700 includes two-bit traffic indicators for the SLPIDs 611, 614, 615 and 616 in which the traffic occurs, but does not include two-bit traffic indicators for the SLPIDs 612 and 613. In this case, it is preferable that the respective traffic indicators that constitute the Traffic-Indicator Bitmap field are allocated in the ascending order of their SLPID values, starting from the LSB 701 corresponding to the least SLPID 611. This field includes 512 traffic indicators that correspond to 1024 bits in order to control 512 MS at maximum.

Fourth, the Half-traffic Mask field will be explained. This field can effectively be used in the case in which the first embodiment and the second embodiment of the present invention are combined. As described above, the respective bit bn of the SLPID-Group-Indication Bitmap indicates a specified SLPID-Group. In the SLPID-Group-Indication Bitmap, if it is set that n=1, it indicates that the traffic occurs in a certain SLPID that is included in the SLPID-Group#n. The respective bits that constitute the Half-traffic Mask correspond to the repective bits of the SLPID-Group-Indication Bitmap in a one-to-one manner. The respective bits of this field are significant only in the case in which the corresponding bit#n of the SLPID-Group-Indication Bitmap is set to bit#n=1. If the corresponding bit#n is set to bit#n=0, the corresponding bit#n of the Half-traffic Mask is disregarded. The significance indicated by the respective bits of this field will now be explained.

Half-traffic Mask bit#n=0: The traffic occurs in SLPIDs the number of which is less than 17 in the corresponding SLPID-Group#n. The BS forms fields that belong to the SLPID-Group#n according to the second embodiment of the present invention, and the MS that belongs to the corresponding SLPID-Group#n decodes the traffic Indicator according to the second embodiment of the present invention.

Half-traffic Mask bit#n=1: The traffic occurs in SLPIDs the number of which is 17 or more in the corresponding SLPID-Group#n. The BS forms fields that belong to the SLPID-Group#n according to the first embodiment of the present invention, and the MS that belongs to the corresponding SLPID-Group#n decodes the traffic Indicator according to the first embodiment of the present invention. In this case, the MS having SLPIDs corresponding to rn, in the case in which rn=1 when R (r15, r14, . . . , r0)=SLPID-Group-Indication Bitmap & Half-traffic Mask, search for the traffic Indicator corresponding to themselves according to the first embodiment of the present invention.

Figure 5:
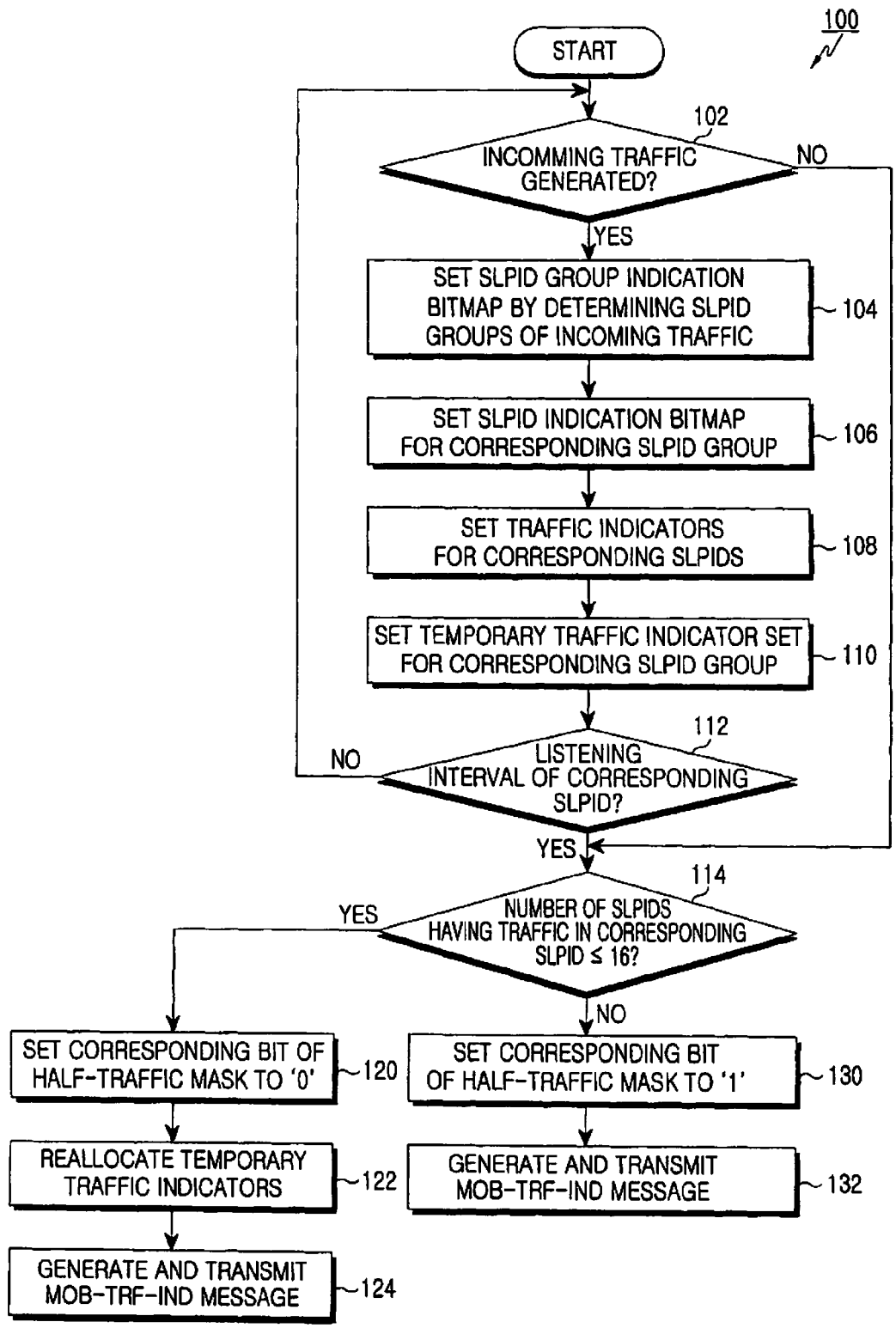
FIG. 5 is a flow chart illustrating a control flow for a BS's transmission of a traffic indication message that indicates whether traffic exists with respect to a plurality of MS according to an embodiment of the present invention.

FIG. 5 is a flow chart illustrating a control flow 100 for a BS's transmission of a traffic indication message that indicates whether traffic exists with respect to a plurality of MS according to an embodiment of the present invention. The control flow of FIG. 5 is applied to the case in which the first embodiment and the second embodiment of the present invention are combined. It is also possible that the first embodiment and the second embodiment of the present invention are independently performed.

As described above, if an SLP-REQ message is received from the MS managed by the BS, the BS informs the corresponding MS of an approval/rejection of the sleep mode requested by the corresponding MS through an SLP-RSP message. If the requested sleep mode is approved, the BS allocates an SLPID in the SLP-RSP message and transmits the message to the corresponding MS.

Thereafter, the BS determines whether an incoming traffic exists at step 102. The BS monitors whether a DL (Download) traffic and a periodic ranging opportunity occur in the SLPID of which the sleep-mode request is approved by the BS.

If the traffic exists in the SLPID that the BS manages, the BS sets the bit#n corresponding to the SLPID-Group#n in the SLPID-Group-Indication Bitmap to "1" in order to inform that the traffic exists in the SLPID-Group#n to which the corresponding SLPID belongs at step 104. Then, the BS sets the SLPID-Indication Bitmap for the corresponding SLPID group at step 106. Accordingly, the bit that corresponds to the corresponding SLPID in the SLPID-Indication Bitmap is set to indicate that the traffic exists.

Then, the BS proceeds to step 108, and set the traffic indicator of the corresponding SLPID. As described above, the traffic indicator is composed of two bits, and can provide the indication of four traffic states. In this case, "00" indicates the state that no periodic ranging opportunity exists and no PDUs (Packet Data Units) such as download traffic and so on exist, "01," indicates the state that no periodic ranging opportunity exists, but PDUs (Packet Data Units) such as download traffic and so on exist, "10" indicates the state that a periodic ranging opportunity exists, but no PDUs (Packet Data Units) such as download traffic and so on exist, and "11" indicates the state that a periodic ranging opportunity exists and PDUs (Packet Data Units) such as download traffic also exist. The traffic indicator of the corresponding SLPID has one of the above-described values.

Meanwhile, the traffic indicator may be composed of one bit, and may provide the indication of the traffic states. For example, a traffic indicator equal to "0" indicates a negative indication that corresponds to no traffic occurrence, and a traffic indicator equal to "1" indicates a positive indication that corresponds to a traffic occurrence.

Additionally, the traffic indicators of the Traffic-Indicator Bitmap are allocated in the ascending order of their SLPID values of the SLPID-Group in which the traffic occurs.

Then, the BS proceeds to step 110, and sets a temporary traffic indicator set for the SLPID group to which the corresponding SLPID belongs. That is, the BS sets the Traffic-Indicator Bitmap for the corresponding SLPID. Additionally, the BS proceeds to step 112, and determines whether the listening interval of the corresponding SLPID arrived. If the listening interval of the corresponding SLPID arrived, the BS proceeds to step 114, and determines whether the number of SLPIDs in which the traffic occurs in the corresponding SLPID group is equal to or smaller than 16. If the number of SLPIDs in which the traffic occurs in the SLPID group is equal to or smaller than 16, the BS proceeds to step 120, sets the bit for the corresponding SLPID group of the Half-traffic Mask field to "0", and then proceeds to step 122.

Meanwhile, if the number of SLPIDs in which the traffic occurs in the SLPID group is larger than 16, the BS proceeds to step 130, sets the bit for the corresponding SLPID group of the Half-traffic Mask field to "1", and then prceeds to step 132.

As described above, in setting the bit#n included in the SLPID-Group-Indication Bitmap to "1", if the number of SLPIDs in which the traffic occurs among the SLPIDs that belong to the Half-traffic Mask field is equal to or smaller than 16, the BS sets the bit corresponding to the SLPID-Group#n in the Half-traffic Mask field to "0" to indicate that the traffic indicator information of the corresponding SLPID-Group#n is transferred through the fields that belong to the SLPID group according to the second embodiment of the present invention. Meanwhile, if the traffic occurs in more than 17 SLPIDs in the corresponding SLDPI-Group#n, the BS sets the bit corresponding to the SLPID-Group#n in the Half-traffic Mask field to "1" to indicate that the traffic indicator information of the corresponding SLPID-Group#n is transferred through the fields that belong to the SLPID group according to the first embodiment of the present invention.

Meanwhile, the BS proceeds to step 132, and transmits the MOB-TRF-IND message that includes the SLPID Group-Indication Bitmap field, the Traffic-Indicator bitmap field and the Half-traffic Mask field set at the foregoing steps.

Then, the BS reallocates the temporary traffic indicator set at step 122. As described above, according to the second embodiment of the present invention, the two-bit traffic indicator for the SLPID in which the traffic does not occur does not actually exist in the Traffic-Indicator Bitmap field. Accordingly, the BS reallocates the Traffic-Indicator Bitmap only by the traffic indicators for the SLPIDs in which the traffic actually occurs. Then, at step 124, the BS transmits the MOB-TRF-IND message that includes the SLPID Group-Indication bitmap field, the Traffic-Indicator bitmap field and the Half-traffic Mask field set at the foregoing steps.

In other words, if the traffic indicator signaling method for a specified SLPID-Group#n follows the first embodiment of the present invention, the BS omits the 32-bit bitmap for the corresponding SLPID-Group#n that is the SLPID-Indication Bitmap. In one embodiment of the present invention, the BS allocates and includes M(=32)×2 bits for the traffic indicator signaling of the corresponding SLPID-Group#n in the Traffic-Indicator bitmap as shown in FIG. 3B. In this case, for the traffic indication that belongs to the corresponding SLPID-Group#n, the BS transmits the MOB-TRF-IND message having a size of 16(SLPID Group-Indication Bitmap)+2*32 (Traffic-Indicator bitmap) bits.

In another embodiment of the present invention, the BS allocates and includes M(=32)×1 bits for the traffic indicator signaling of a specified SLPID-Group#n in the Traffic-Indicator bitmap. In this case, for the traffic indication that belongs to the corresponding SLPID-Group#n, the BS transmits the MOB-TRF-IND message having a size of 16(SLPID Group-Indication Bitmap)+1*32(Traffic-Indicator bitmap) bits.

Meanwhile, if the traffic indicator signaling method for a specified SLPID-Group#n follows the second embodiment of the present invention, the BS includes the 32-bit bitmap for the corresponding SLPID-Group#n in the SLPID-Indication Bitmap 600 of FIG. 4B. Through this 32-bit bitmap, the BS determines the SLPIDs in which the traffic occurs among the SLPIDs that belong to the SLPID-Group#n. Then, the BS determines the number M of bits of which the values are set to "1" in the selected 32-bit bitmap.

Then, the BS allocates and includes M×2 bits according to the value M determined as above in the Traffic-Indicator bitmap as shown in FIG. 4c. In this case, for the traffic indication that belongs to the corresponding SLPID-Group#n, the BS transmits the MOB-TRF-IND message having a size of 16(SLPID Group-Indication bitmap)+32(SLPID-Indication bitmap)+M82(Traffic-Indicator bitmap) bits. At that time, the two-bit value corresponding to traffic-Indicator=00 may be replaced by the one-bit information included in the SLPID-Indication bitmap List.

Now, the case in which the MS has received the above-described MOB-TRF-IND message will be explained.

Figure 6:
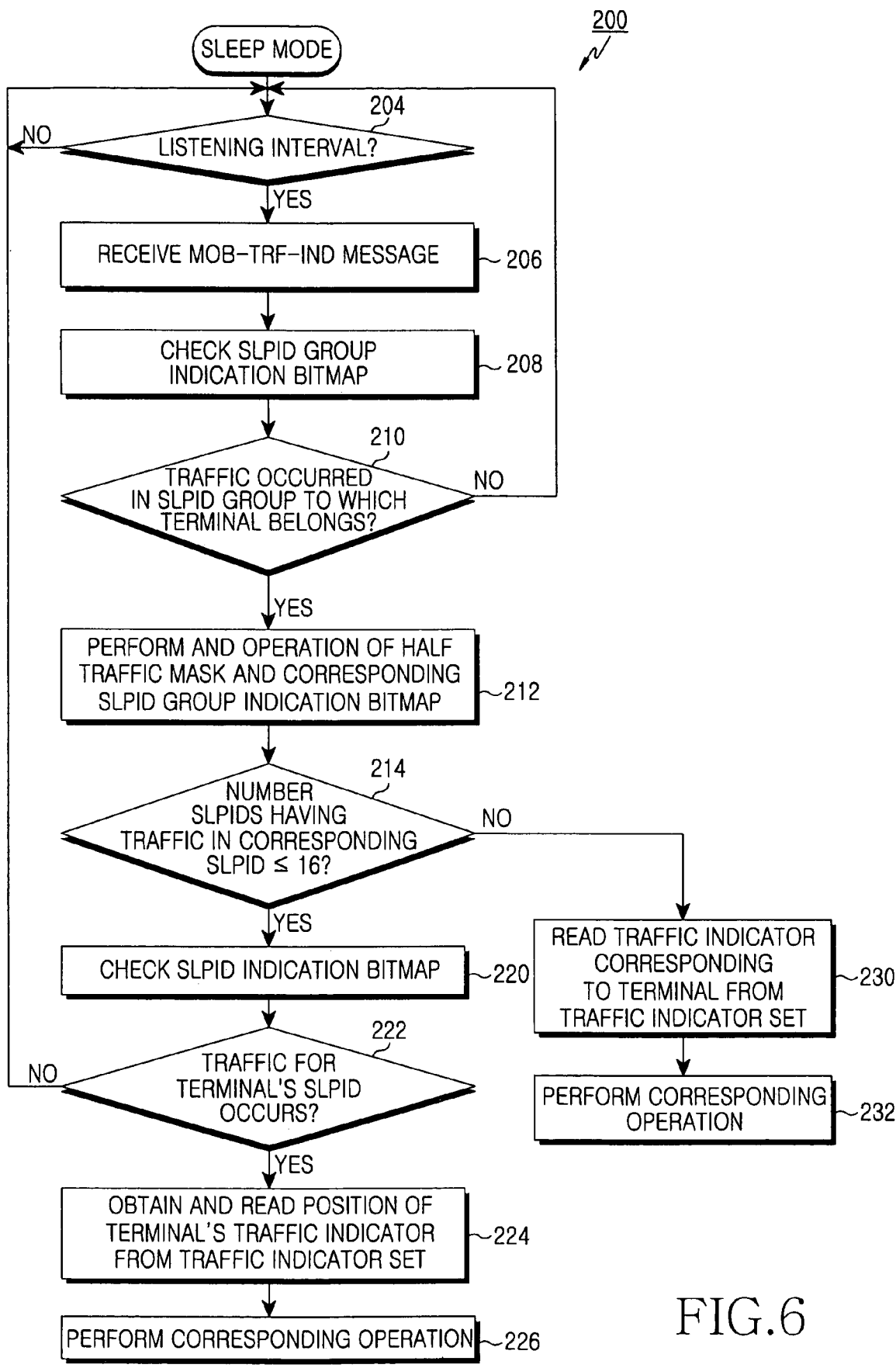
FIG. 6 is a flow chart illustrating a control flow for a MS's reception of a traffic indication message that indicates whether traffic exists with respect to a plurality of MS according to an embodiment of the present invention.

FIG. 6 is a flow chart illustrating a control flow 200 for a MS's reception of a traffic indication message that indicates whether traffic exists with respect to a plurality of MS according to an embodiment of the present invention. The control flow of FIG. 6 is applied to the case in which the first embodiment and the second embodiment of the present invention are combined in the similar manner to the control flow of FIG. 5.

It is also possible that the first embodiment and the second embodiment of the present invention are independently performed.

The MS, which is allocated with the value of SLPID=k through the SLP-REP message sent from the BS, performs a sleep-mode operation that corresponds to SLPID=k. At that time, the MS calculates the SLPID-Group#n (here, n=k/32) to which the allocated SLPID=k belongs.

Referring to FIG. 6, the MS determines whether the listening interval arrives in the corresponding sleep-mode pattern at step 204. If the listening interval arrives, the MS shifts to a receivable state and receives the MOB-TRF-IND message at step 206. Then, the MS proceeds to step 208, and finds the bit#n value corresponding to the SLPID-Group#n to which the MS belongs by searching the SLPID-Group-Indication bitmap field from the MOB-TRF-IND message. Then, the MS determines whether the traffic exists in the SLPID group to which the MS itself belongs at step 210. Specifically, if the corresponding bit#n value of the SLPID-Group-Indication bitmap field is "0", the MS determines that no traffic occurs in the SLPID-Group#n (where, n=k/32) to which the allocated SLPID=k belongs, and returns to the sleep interval when the present listening interval is terminated (i.e., to step 204).

If the bit#n value is "1", the MS proceeds to step 212, and performs an AND operation of the Half-traffic Mask field and the SLPID-Group-Indication bitmap field. Also, the MS finds the resultant value of the bit corresponding to the bit#n from 16 bits generated at step 214. That is, if the corresponding bit#n is "1", the MS determines that the number of SLPIDs in which the traffic exists in the corresponding SLPID group is larger than 16, and proceeds to step 230.

Specifically, if the corresponding bit#n is "0", the MS determines that the number of SLPIDs in which the traffic occurs in the corresponding SLPID group is equal to or smaller than 16, and proceeds to step 220. At step 220, the MS determines that the BS performs the traffic indicator signaling with respect to the SLPID-Group#n according to the second embodiment of the present invention, and checks the 32-bit bitmap corresponding to the SLPID-Group#n to which its SLPID belongs from the SLPID-Indication bitmap List.

Then, at step 222, the MS determines whether the traffic for its SLPID actually exists in the 32-bit bitmap corresponding to the SLPID-Group#n to which its SLPID belongs. At that time, if the SLPID value of the MS is k, the MS recognizes that the bit#m that satisfies m=k % 32 among the above-described 32-bit bitmap is the bit corresponding to its SLPID. In the case in which the bit#n value is "0", the MS recognizes that no traffic exists in the MS itself, disregards the following parameters, and prepares for the entering into the sleep interval when the listening interval is terminated.

That is, if the value of the operation result of bit#n that corresponds to a certain SLPID-Group#n is "0" as a result of SLPID-Group-Indication bitmap, and (=bitwise AND) Half-traffic Mask, the 32-bit information of the corresponding SLPID-group is included in the SLPID-Indication bitmap List. The MS that have received the MOB-TRF-IND message as described above determines whether the traffic occurs through the 32-bit information that corresponds to their groups included in the SLPID-Group-Indication bitmap and SLPID-Indication bitmap, and if it is determined that the traffic occurs, the MS read the two-bit traffic indicators that correspond to the MS from the Traffic-Indicator bitmap. The second embodiment of the present invention may be applied to the case in which the traffic occurs in not more than 16 SLPIDs among 32 SLPIDs included in the corresponding SLPID-Group, and this is for reducing the number of bits of the information transmitted through the MOB-TRF-IND message.

If the bit#n value is "1", the traffic occurs in the MS itself, and the MS proceeds to step 224 to obtain the traffic indicator position value corresponding to its SLPID from the Traffic-Indicator bitmap. That is, in the Traffic-Indicator bitmap, only the information of the SLPIDs (the number of which is P), in which the traffic actually occurs in the SLPID-Group#n to which the BSS itself belongs, is included. Accordingly, the 2*P bits after the bit corresponding to the end of the information related to the SLPID-Group#(n−1), which is the previous group of the SLPID-Group#n to which the SLPID of the MS itself belongs in the Traffic-Indicator bitmap, is the traffic indicator information for the SLPID-Group#n of the MS. In this range [strat, start+2*P−1], if the MS obtains the number (=L) of SLPIDs that are smaller than SLPID=k of the MS itself among the number (=P) of SLPIDs, the range [start+2*L, start+2*L+1] becomes the two-bit traffic indicator information allocated to the MS itself. Then, the MS perform an operation determined according to the present standard according to the two-bit information found at step 226.

Meanwhile, if it is determined that the corresponding bit#n is "1", the MS determines that the number of SLPIDs in which the traffic occurs in the corresponding SLPID group is larger than 16, and proceeds to step 230. At step 230, the MS judges that the BS performs the traffic indicator signaling with respect to the SLPID-Group#n according to the first embodiment of the present invention, omits the SLPID-Indication bitmap search, and directly searches the Traffic-Indicator bitmap field.

The 2*32 bits after the bit corresponding to the end of the information corresponding to the SLPID-Group#(n−1), which is the previous group of the SLPID-Group#n to which the SLPID of the MS belongs in the Traffic-Indicator bitmap field, is the traffic indicator information for the SLPID-Group#n of the MS itself. In this range [strat, start+64−1], if the MS obtains t that satisfies t=k % 32 from its SLPID=k, the range [start+2t, start+(2t+1)] becomes the two-bit traffic indicator information allocated to the MS itself. Then, the MS performs an operation determined according to the present standard according to the two-bit information found at step 232.

In other words, if the value of the operation result of bit#n that corresponds to a certain SLPID-Group#n is "1" as a result of SLPID-Group-Indication bitmap & (=bitwise AND) Half-traffic Mask, the 32-bit information of the corresponding SLPID-group is not included in the SLPID-Indication bitmap. Also, the BS includes the 64-bit information of the 32 SLPIDs that belong to the corresponding SLPID-Group in the Traffic-Indicator bitmap field.

The MS that have received the MOB-TRF-IND message as described above determines whether the traffic occurs in the SLPID-group to which the BSS belongs through the decoding of the SLPID-Group-Indication bitmap, and if it is determined that the traffic occurs, the MS find the position of the 64-bit information corresponding to the SLPID-Group to which the MS belong, and read the two-bit traffic indicators that correspond to their SLPIDs from the 64-bit information. The first embodiment of the present invention may be applied to the case in which the traffic occurs in 17 or more SLPIDs among 32 SLPIDs included in the corresponding SLPID-Group, and this is for reducing the number of bits of the information transmitted through the MOB-TRF-IND message.

As described above, according to the present invention, the Standard can modified to further define vague definitions. In the embodiment of the present invention, the traffic indicator information is transmitted to the MS that are operating in a sleep mode by allocating rational bits. Also, in an embodiment of the present invention, the size of the broadcasting MOB-TRF-IND message can be reduced by dynamically providing two kinds of algorithms so that the traffic indication information bits can efficiently be reduced according to the number of SLPIDs in which the traffic occurs in the respective SLPID-Group#n.

In the embodiment of the present invention, the traffic indicator signaling is performed with respect to 512 SLPIDs that operate in a sleep mode. However, if the SLPIDs are extended to 10-bit SLPIDs defined in the present standard, the traffic indicator signaling can be performed with respect to 1024 SLPIDs using the 32-bit SLPID-Group-Indication bitmap.

The BS can simply control the amount of traffic indicator information transferred through the MOB-TRF-IND message according to the amount of traffic occurring until the corresponding listening interval using the SLPID-Group-Indication bitmap, Half-traffic Mask, SLPID-Indication bitmap and Traffic-Indicator bitmap.

If the channel environment is not good, a MOB-TRF-IND message to which a robust coding/modulation is applied can be used. In this case, by properly setting the SLPID-Group-Indication bitmap, the traffic indicator information can properly be distributed and transmitted.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A system for transmitting a traffic indication (MOB_TRF-IND) message in a Broadband Wireless Access communication system, comprising:
    a Base Station (BS) for transmitting the MOB_TRF-IND message including a sleep mode ID (SLPID) Group Indication Bitmap and a Traffic Indication Bitmap,
    wherein the SLPID Group Indication Bitmap includes N SLPID Group Indication bits, each of the N SLPID Group Indication bits corresponding to each of N SLPID groups, and the N SLPID groups are generated by grouping N*M SLPIDs,
    wherein each of the N SLPID Group Indication bits indicates that there is no traffic for M Mobile Stations (MSs) mapped to M SLPIDs included in a corresponding SLPID group or that there is traffic for at least one of the M MSs mapped to the M SLPIDs included in the corresponding SLPID group,
    wherein the Traffic Indication Bitmap includes multiples of an M-bit long Traffic Indication unit, the M-bit long Traffic Indication unit being added to the MOB_TRF-IND message when an SLPID Group Indication bit indicates that there is traffic for at least one MS among the M MSs mapped to the M SLPIDs included in an SLPID Group, the M-bit long Traffic Indication unit including M bits, each of the M bits corresponds to each of the M MSs mapped to the M SLPIDs included in the SLPID Group, each of the M bits indicating a negative indication that indicates that there is no traffic directed to a corresponding MS or a positive indication indicates that there is traffic directed to the corresponding MS, and
    wherein an SLPID of an MS is uniquely assigned by the BS when the MS is instructed to enter a sleep mode.

2. A system for receiving a traffic indication (MOB_TRF-IND) message in a Broadband Wireless Access communication system, comprising:
    a Mobile Station (MS) for being allocated with one of N*M sleep mode IDs (SLPIDs), included in one of N SLPID groups, and receiving the MOB_TRF-IND message including an SLPID Group Indication Bitmap and a Traffic Indication Bitmap,
    wherein the SLPID Group Indication Bitmap includes N SLPID Group Indication bits, each of the N SLPID Group Indication bits corresponding to each of the N SLPID groups,
    wherein each of the N SLPID Group Indication bits indicates that there is no traffic for M MSs mapped to M SLPIDs included in a corresponding SLPID group or that there is traffic for at least one of the M MSs mapped to the M SLPIDs included in the corresponding SLPID group,
    wherein the Traffic Indication Bitmap includes multiples of an M-bit long Traffic Indication unit, the M-bit long Traffic Indication unit being added to the MOB_TRF-IND message when an SLPID Group Indication bit indicates that there is traffic for at least one MS among the M MSs mapped to the M SLPIDs included in an SLPID group, the M-bit long Traffic Indication unit including M bits, each of the M bits corresponding to each of the M MSs mapped to the M SLPIDs included in the SLPID Group, each of the M bits indicating a negative indication that indicates that there is no traffic directed to a corresponding MS or a positive indication indicates that there is traffic directed to the corresponding MS,
    wherein the N SLPID groups are generated by grouping the N*M SLPIDs by a Base Station (BS), and
    wherein an SLPID of an MS is uniquely assigned by the BS when the MS is instructed to enter a sleep mode.

3. The system as claimed in claim 2, wherein the MS detects an SLPID Group Indication bit corresponding to its location from the SLPID Group Indication Bitmap, determines that there is no traffic for all MSs mapped to the M SLPIDs included in an SLPID group corresponding to the SLPID Group Indication bit or that there is traffic for at least one of the MSs mapped to the M SLPIDs included in the SLPID group corresponding to the SLPID Group Indication bit, detects the Traffic Indication Bitmap, if it is determined that there is traffic for the at least one of the MSs mapped to the M SLPIDs included in the SLPID group corresponding to the SLPID Group Indication bit, and avoids detecting the Traffic Indication Bitmap, if it is determined that there is no traffic for all the MSs mapped to the M SLPIDs included in the SLPID group corresponding to the SLPID Group Indication bit.

4. The system as claimed in claim 3, wherein the MS detects a bit corresponding to its location in an M-bit long Traffic Indication unit corresponding to the SLPID Group corresponding to the SLPID Group Indication bit after detecting the Traffic Indication Bitmap, and determines whether there is traffic directed to the MS depending on the detected bit.

5. A method for transmitting a traffic indication (MOB_TRF-IND) message by a Base Station (BS) in a Broadband Wireless Access communication system, the method comprising:
    transmitting the MOB_TRF-IND message including a sleep mode ID (SLPID) Group Indication Bitmap and a Traffic Indication Bitmap,
    wherein the SLPID Group Indication Bitmap includes N SLPID Group Indication bits, each of the N SLPID Group Indication bits corresponding to each of N SLPID groups, and the N SLPID groups are generated by grouping N*M SLPIDs, wherein each of the N SLPID Group Indication bits indicates that there is no traffic for M Mobile Stations (MSs) mapped to M SLPIDs included in a corresponding SLPID group or that there is traffic for at least one of the M MSs mapped to the M SLPIDs included in the corresponding SLPID group, wherein the Traffic Indication Bitmap includes multiples of an M-bit long Traffic Indication unit, the M-bit long Traffic Indication unit being added to the MOB_TRF-IND message when an SLPID Group Indication bit indicates that there is traffic for at least one MS among the M MSs mapped to the M SLPIDs included in an SLPID Group, the M-bit long Traffic Indication unit including M bits, each of the M bits corresponding to each of the M MSs mapped to the M SLPIDs included in the SLPID Group, each of the M bits indicating a negative indication that indicates that there is no traffic directed to a corresponding MS or a positive indication that indicates that there is traffic directed to the corresponding MS, and wherein an SLPID of an MS is uniquely assigned by the BS when the MS is instructed to enter a sleep mode.

6. A method for receiving a traffic indication (MOB_TRF-IND) message by a Mobile Station (MS) in a Broadband Wireless Access communication system, the method comprising:

being allocated with one of N*M sleep mode IDs (SLPIDs), included in one of N SLPID groups; and receiving the MOB_TRF-IND message including an SLPID Group Indication Bitmap and a Traffic Indication Bitmap, wherein the SLPID Group Indication Bitmap includes N SLPID Group Indication bits, each of the N SLPID Group Indication bits corresponding to each of the N SLPID groups, wherein each of the N SLPID Group Indication bits indicates that there is no traffic for M MSs mapped to M SLPIDs included in a corresponding SLPID group or that there is traffic for at least one of the M MSs mapped to the M SLPIDs included in the corresponding SLPID group, wherein the Traffic Indication Bitmap includes multiples of an M-bit long Traffic Indication unit, the M-bit long Traffic Indication unit being added to the MOB_TRF-IND message when an SLPID Group Indication bit indicates that there is traffic for at least one MS among the M MSs mapped to the M SLPIDs included in an SLPID Group, the M-bit long Traffic Indication unit includes M bits, each of the M bits corresponding to each of the M MSs mapped to the M SLPIDs included in the SLPID Group, each of the M bits indicating a negative indication that indicates that there is no traffic directed to a corresponding MS or a positive indication that indicates that there is traffic directed to the corresponding MS, wherein the N SLPID groups are generated by grouping the N*M SLPIDs by a Base Station (BS), and wherein an SLPID of an MS is uniquely assigned by the BS when the MS is instructed to enter a sleep mode.

7. The method of claim 6, further comprising:

detecting an SLPID Group Indication bit corresponding to its location from the SLPID Group Indication Bitmap;

determining that there is no traffic for all MSs mapped to the M SLPIDs included in an SLPID Group corresponding to the SLPID Group Indication bit or that there is traffic for at least one the MSs mapped to the M SLPIDs included in the SLPID group corresponding to the SLPID Group Indication bit;

detecting the Traffic Indication Bitmap, if it is determined that there is traffic for at least one of the MSs mapped to the M SLPIDs included in the SLPID group corresponding to the SLPID Group Indication bit; and avoiding detecting the Traffic Indication Bitmap, if it is determined that there is no traffic for all of the MSs mapped to the M SLPIDs included in the SLPID group corresponding to the SLPID Group Indication bit.

8. The method of claim 7, further comprising:

detecting a bit corresponding to its location in the M-bit long Traffic Indication unit corresponding to the SLPID group corresponding to the SLPID Group Indication bit, after detecting the Traffic Indication Bitmap; and determining whether there is traffic directed to the MS depending on the detected bit.

9. The system as claimed in claim 1, wherein each of the N SLPID Group Indication bits indicates that there is no traffic for the M MSs mapped to the M SLPIDs included in the corresponding SLPID group when each of the N SLPID Group Indication bits is 0, and each of the N SLPID Group Indication bits indicates that there is traffic for the at least one of the M MSs mapped to the M SLPIDs included in the corresponding SLPID group when each of the N SLPID Group Indication bits is 1.

10. The system as claimed in claim 9, wherein the M is 32.

11. The system as claimed in claim 10, wherein the M bits correspond to each of the M MSs mapped to the M SLPIDs included in the SLPID Group in an ascending order of the M SLPIDs included in the SLPID Group.

12. The system as claimed in claim 1, wherein each of the M bits indicates a negative indication that there is no traffic directed to the corresponding MS when each of the M bits is 0, and each of the M bits indicates a positive indication that there is traffic directed to the corresponding MS when each of the M bits is 1.

13. The system as claimed in claim 12, wherein M is 32.

14. The system as claimed in claim 13, wherein the M bits correspond to each of the M MSs mapped to the M SLPIDs included in the SLPID Group in an ascending order of the M SLPIDs included in the SLPID Group.

15. The system as claimed in claim 2, wherein each of the N SLPID Group Indication bits indicates that there is no traffic for the M MSs mapped to the M SLPIDs included in the corresponding SLPID group when each of the N SLPID Group Indication bits is 0, and each of the N SLPID Group Indication bits indicates that there is traffic for the at least one of the M MSs mapped to the M SLPIDs included in the corresponding SLPID group when each of the N SLPID Group Indication bits is 1.

16. The system as claimed in claim 15, wherein M is 32.

17. The system as claimed in claim 16, wherein the M bits correspond to each of the M MSs mapped to the M SLPIDs included in the SLPID Group in an ascending order of the M SLPIDs included in the SLPID Group.

18. The system as claimed in claim 2, wherein each of the M bits indicates, negative indication that there is no traffic directed to the corresponding MS when each of the M bits is 0, and each of the M bits indicates a positive indication that there is traffic directed to the corresponding MS when each of the M bits is 1.

19. The system as claimed in claim 18, wherein M is 32.

20. The system as claimed in claim 19, wherein the M bits correspond to each of the M MSs mapped to the M SLPIDs included in the SLPID Group in an ascending order of the M SLPIDs included in the SLPID Group.

21. The method as claimed in claim 5, wherein each of the N SLPID Group Indication bits indicates that there is no traffic for the M MSs mapped to the M SLPIDs included in the corresponding SLPID group when each of the N SLPID Group Indication bits is 0, and each of the N SLPID Group Indication bits indicates that there is traffic for the at least one of the M MSs mapped to the M SLPIDs included in the corresponding SLPID group when each of the N SLPID Group Indication bits is 1.

22. The method as claimed in claim 21, wherein M is 32.

23. The method as claimed in claim 22, wherein the M bits correspond to each of the M MSs mapped to the M SLPIDs included in the SLPID Group in an ascending order of the M SLPIDs included in the SLPID Group.

24. The method as claimed in claim 5, wherein each of the M bits indicates a negative indication that there is no traffic directed to the corresponding MS when each of the M bits is 0, and each of the M bits indicates a positive indication that there is traffic directed to the corresponding MS when each of the M bits is 1.

25. The method as claimed in claim 24, wherein M is 32.

26. The method as claimed in claim 25, wherein the M bits correspond to each of the M MSs mapped to the M SLPIDs included in the SLPID Group in an ascending order of the M SLPIDs included in the SLPID Group.

27. The method as claimed in claim 6, wherein each of the N SLPID Group Indication bits indicates that there is no traffic for the M MSs mapped to the M SLPIDs included in the corresponding SLPID group when each of the N SLPID Group Indication bits is 0, and each of the N SLPID Group Indication bits indicates that there is traffic for the at least one of the M MSs mapped to the M SLPIDs included in the corresponding SLPID group when each of the N SLPID Group Indication bits is 1.

28. The method as claimed in claim 27, wherein M is 32.

29. The method as claimed in claim 28, wherein the M bits correspond to each of the M MSs mapped to the M SLPIDs included in the SLPID Group in an ascending order of the M SLPIDs included in the SLPID Group.

30. The method as claimed in claim 6, wherein each of the M bits indicates a negative indication that there is no traffic directed to the corresponding MS when each of the M bits is 0, and each of the M bits indicates a positive indication that there is traffic directed to the corresponding MS when each of the M bits is 1.

31. The method as claimed in claim 30, wherein M is 32.

32. The method as claimed in claim 31, wherein the M bits correspond to each of the M MSs mapped to the M SLPIDs included in the SLPID Group in an ascending order of the M SLPIDs included in the SLPID Group.

\* \* \* \* \*